(12) United States Patent
McRae et al.

(10) Patent No.: US 8,355,085 B2
(45) Date of Patent: Jan. 15, 2013

(54) TELEVISION REMOTE CONTROL UPDATE UPON EVENT

(75) Inventors: Matthew Blake McRae, Laguna Beach, CA (US); Peter Jay Schwartz, Fullerton, CA (US)

(73) Assignee: Vizio, Inc., Irvine, CA (US)

( * ) Notice: Subject to any disclaimer, the term of this patent is extended or adjusted under 35 U.S.C. 154(b) by 425 days.

(21) Appl. No.: 12/648,318

(22) Filed: Dec. 29, 2009

(65) Prior Publication Data

US 2011/0157469 A1 Jun. 30, 2011

(51) Int. Cl.
*H04N 5/44* (2006.01)

(52) U.S. Cl. ........................................ 348/725; 348/734

(58) Field of Classification Search ................... 348/725, 348/554, 734; 725/37, 48, 59; *H04N 5/44, H04N 3/27*
See application file for complete search history.

(56) References Cited

U.S. PATENT DOCUMENTS

| | | | |
|---|---|---|---|
| 8,134,650 B2* | 3/2012 | Maxson et al. | 348/734 |
| 2010/0013998 A1* | 1/2010 | Mortensen | 348/734 |
| 2010/0309389 A1* | 12/2010 | Hicks | 348/734 |
| 2011/0075052 A1* | 3/2011 | Arling et al. | 348/734 |

* cited by examiner

*Primary Examiner* — Sherrie Hsia
(74) *Attorney, Agent, or Firm* — Law Office of Scott C. Harris, Inc.

(57) ABSTRACT

A television includes a remote control, at least two inputs and at least one device, each device connected to one of the inputs. Upon a system event such as changing from one input to another input, the television signals the remote control to change operation of at least one function key.

10 Claims, 9 Drawing Sheets

| CM5 | |
|---|---|
| B-Name | B-Val |
| VCTRL | 3A20 |
| CCTRL | 3A2F |
| ONOFF | 3AE2 |
| 1 | 2C01 |
| 2 | 2C02 |
| ⋮ | ⋮ |

FIG.4

| CM5 | |
|---|---|
| B-Name | B-Val |
| VCTRL | 2F20 |
| CCTRL | 3A2F |
| ONOFF | 3AE2 |
| 1 | 2C01 |
| 2 | 2C02 |
| ⋮ | ⋮ |

FIG.5

TELEVISION REMOTE CONTROL UPDATE UPON EVENT

FIELD

This invention relates to the field of televisions and more particularly to a system for changing the operation of a television remote control in response to certain events occurring within the television.

BACKGROUND

Television devices such as LCD or Plasma televisions are becoming more sophisticated each year. Already, most have a processor and memory and a remote control as an input device. Soon, many television devices will have Internet connections and mass storage devices (e.g., disk drives). The Internet connection and storage will be used for many purposes, including the download and storage of content (e.g., movies). The television devices have or will have input ports or other types of connections, either wired or wireless for the connection of devices such as phones, cameras, storage devices, printers, music players, etc.

In some homes and businesses, the television is simply connected to a content source such as cable or, simply an antenna. Recently, more often, there are many other devices connected to a television. For example, in order to receive high-definition television broadcasts, the television is often connected to a set-top box. Due to the limited speaker size and audio capabilities of most televisions, they are often connected to external amplifiers and speaker systems. Other forms of content delivery devices are often connected to the television such a disk players (DVD, Blueray), Video Cassette Recorders (VCR) and music/video players.

Most of these connected devices operate independently and are unaware of each other. For example, when the television changes from an input connected to a game system to an input connected to movie content, the amplifier is not aware of the change and does not alter its settings. In such a situation, it is desirable to change certain settings in the amplifier to match the television source. For example, the user likes a certain audio response curve for games and a different audio response curve for movies or a different volume level.

Almost every television produced has some form of remote control. A large majority of the remote controls use infrared to wirelessly transmit command signals to the television. Additionally, many of the devices connected to the television also have remote controls. Such often results in a household having many remote control devices, one for the television, one for the external amplifier/receiver, one for the set-top box, one for the disk player, etc.

Even though most devices are provided with a remote control, attempts have been made to reduce the number of active remote controls needed in any given system to one remote control. This is often referred to as a Universal Remote Control (e.g., it is capable of controlling many different devices). The goal is to have one remote control that is able to command several devices, including the television.

A universal remote is a remote control that can be programmed to operate various brands or types of devices. An early universal remote was described in U.S. Pat. No. 4,774,511 to Rumbolt, et al. Today, many remote controls provided with televisions, set-top boxes, etc., provide some form of a universal remote function. Many of these remotes have mode buttons to select which particular device is being controlled and function buttons, the button that initiates an action. The mode buttons are often labeled "TV", "VCR", "DVD", "AUX," etc. The intent is that, after pressing one of the mode buttons, the remote control is configured to send commands to that device. The function buttons are often labeled with numbers, letters and symbols indicating their respective commands such as the digits 0-9, symbols for play, stop, pause, etc. For example, to change the channel on a TV, the "TV" mode button is pressed and then the digits of the desired channel are pressed.

One problem that has been overcome with modern remote control technology is that of device brand and model. Each manufacturer uses a specific set of commands between their remote controls and their devices. Therefore, the universal remote control must be told which set of commands are used for each device it is to control. This is often accomplished by using a paper (or on-line) table organized by type of device (e.g., television, set-top box, disk player, etc.) then manufacturer. The table then contains one or more 3-digit codes for that type of device and manufacturer. For example, an X10 universal remote, model UR74A lists, under televisions, approximately 100 manufacturers, one of which is Zenith. Under Zenith, there are ten different 3-digit codes. To program this universal remote to control a Zenith television, specific key sequences are entered followed by one of these ten 3-digit code sets, then the universal remote is used to determine if that code set is correct (e.g., pressing on/off turns on the television). These tables are often out-dated, for example, the table referenced above does not contain any entries for Vizio and several other manufacturers, even though, televisions produced by such manufacturers are capable of responding to these same infrared code sets.

Another way to program a universal remote control is through a learning mode. In this, the universal remote control has an infrared receiver and is placed in the learn mode, for example, to learn the code set used by a particular television. Then, the remote control provided with that device (television) is aimed at the infrared receiver and the universal remote control receives the commands and determines which code set is to be used to control that device (television).

All of this results in a remote control that, after pressing the appropriate mode button, controls one particular device. In this, if you have a television connected to a set-top box, you must press the set-top box mode button to change channels then the television mode button to change the volume, brightness, etc. Some recent remote controls are programmable so that the volume keys always control a particular device (e.g., the television or external amplifier) irrespective of which mode button has been pressed.

Current remote control technology is not able to understand the context of the system it controls. For example, if a VCR and a set-top box are connected to a television and the input of the television is changed from the set-top box to the VCR, after the change, channel up/down function keys result in commands from the remote to the set-top box, even though the set-top box is no longer in use.

What is needed is a television system that will provide context to the remote control to improve the user experience.

SUMMARY

The present invention includes a television with a remote control, at least two inputs and at least one connected device (component). Upon a system event such as changing from one input to another input, the television signals the remote control to change operation.

For example, upon a change from a first input (HDMI1) to a second input (HDMI2), a command is sent to the remote control to issue commands identified by a device connected to the second input (HDMI2).

In one embodiment, a system for controlling a remote control is disclosed including a bi-directional interface between a television and the remote control. A plurality of events is recognized and there is a mechanism for storing settings related to each of the events. A mechanism exists for detecting one of the events and for transmitting the settings related to that event from the television to the remote control responsive to an occurrence of the event.

In another embodiment, a method of controlling a remote control connected to a television is disclosed including providing a bi-directional interface between the television and the remote control and storing a set of settings within the television, the settings are related to an event within the television. Upon detecting an occurrence of the event a subset of the settings related to the event are sent from the television to the remote control over the bi-directional interface.

In another embodiment, a television is disclosed including a display panel with a processing element interfaced to the display panel and a remote control wirelessly interfaced to the television over a bi-direction interface. The television has a plurality of television inputs operatively coupled to the processing element with at least one device connected to the television through one of the television inputs. A set of parameters is stored within the television and there is a mechanism for changing the television from displaying content from a first input of the television inputs to a second input of the television inputs. When the television is changed from displaying content from a first input of the television inputs to a second input, a subset of the set of the parameters is sent to the remote control. The subset is associated with the second input of the television inputs.

In another embodiment, a television is disclosed including a display panel with a processing element interfaced to the display panel. There are a plurality of High Definition Media Interface (HDMI) inputs operatively coupled to the processing element with at least one source of content, each source of content is connected to one of the High Definition Media Interface (HDMI) inputs. There are a set of parameters associated with each of the plurality of High Definition Media Interface (HDMI) inputs. Software running on the processing element is configured to change the television from displaying content from a first HDMI input of the High Definition Media Interface (HDMI) inputs to a second HDMI input of the High Definition Media Interface (HDMI) inputs and configured to transmitting a subset of the set of the parameters to the remote control responsive to the change from displaying content from the first HDMI input to the second HDMI input, the subset associated with the second HDMI input.

BRIEF DESCRIPTION OF THE DRAWINGS

The invention can be best understood by those having ordinary skill in the art by reference to the following detailed description when considered in conjunction with the accompanying drawings in which:

FIG. 4 illustrates a first data structure of a typical remote control.

FIG. 5 illustrates a second data structure of a typical remote control.

DETAILED DESCRIPTION

Figure 1:
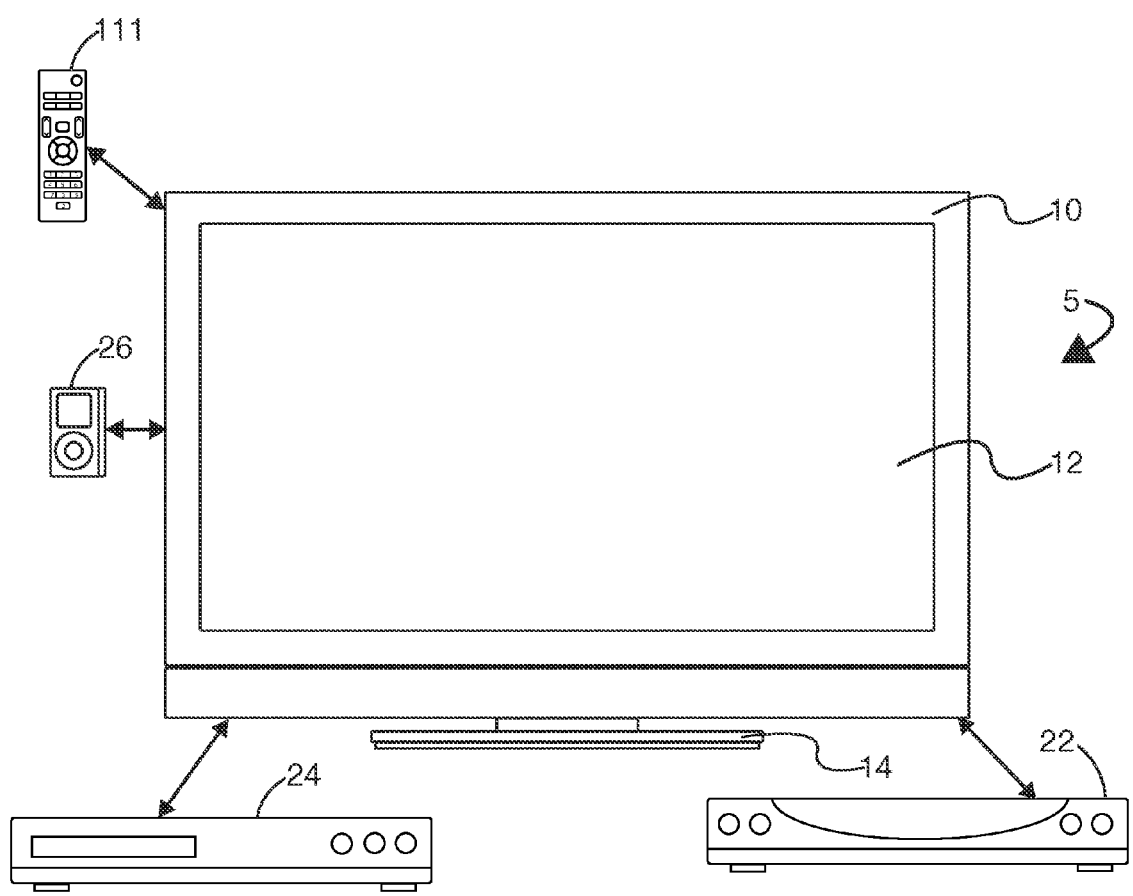
FIG. 1 illustrates a simplified schematic view of a television connected to several devices.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a schematic view of a television 5 will be described. A typical television 5 has a display panel 12, for example, a liquid crystal display (LCD) panel, a Plasma panel, an array of light emitting diodes (LEDS), a CRT and an organic LED (OLED), etc. Usually, the display panel 12 is bordered by a bezel 10 to cover the frame and/or electronics of the display panel 12. In some embodiments, the television 5 is supported by a base 14.

A remote control 111 is wirelessly interfaced to the television 5. The wireless interface is any known wireless interface including, but not limited to, infrared, IRDA, Bluetooth, radio frequency, ultra-wide band RF, WiFi/802.11, ultrasonic, any form of light, etc.

In addition, several devices 22/24/26 are interfaced to the television 5. In this example, a set-top box 22, a disk player 24 and an audio/video player 26 are interfaced to the television 5 for example purposes. Any number of devices and types of devices are anticipated by the present invention.

In this example, the remote control 111 is a universal remote control and is capable of controlling at least the television and one other of the devices 22/24/26. One feature of the remote control 111 is the ability to change the input of the television 5 to show content from a selected one of the devices. For example, in one embodiment of a remote control 111, each time a button labeled "input" is pressed, the input of the television 5 cycles to the next input (e.g., HDMI1, HDMI2, HDMI3, Analog, TV, HDMI1, HDMI2, etc.).

Note that a change of input is described as an example of an event within a television system that is of interest to the remote control and the present invention is not limited to only this type of event. Another example of an event is a change of the television 5 channel, whereby, in some televisions 5, changing the channel below channel 1 often changes the input of the television 5.

Figure 2:
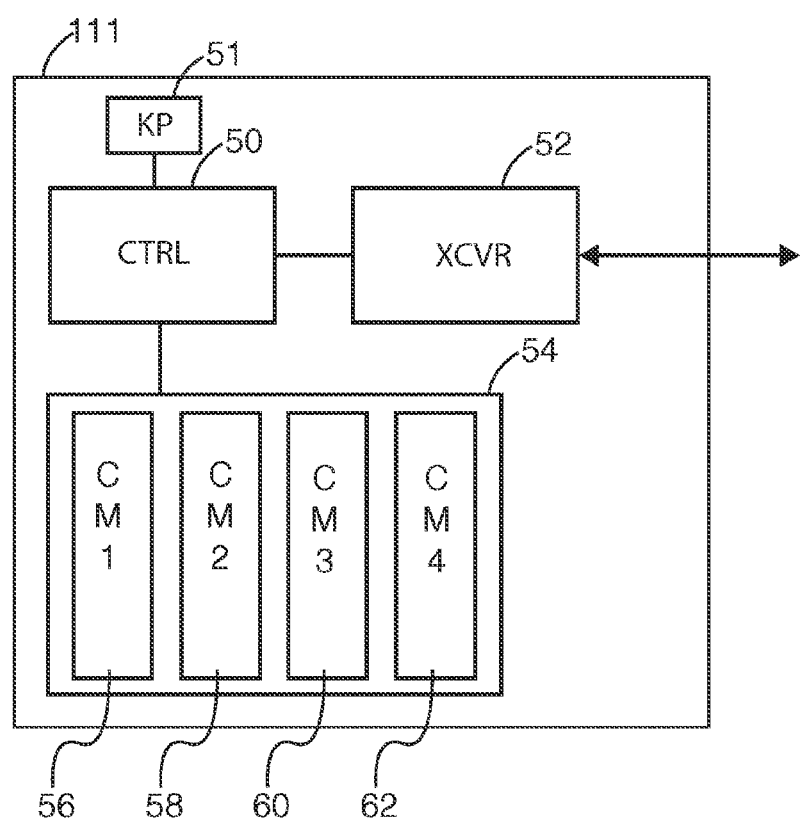
FIG. 2 illustrates a schematic view of a typical remote control.

Referring to FIG. 2, a schematic view of a typical remote control will be described. A typical remote control 111 includes a keypad 51. The keypad 51 is scanned by the controller 50 to determine which key has been pressed. The controller has a dataset of code sets 54 shown greatly simplified. Each code set 56/58/60/62 is associated with a particular device type and code set index (e.g., device-type is VCR and code set index is 031). Manufacturers of devices use one or a few code sets to control their devices. For example, Sony TVs use code set indexes 002 and 008.

In some remote controls 111, a single button results in the sending of multiple commands. For example, in some remote controls 111, the on/off button 120 sends several on/off commands one to each of the multiple controlled devices.

As an example of operation, to control a first device, such as a VCR, a user presses the "VCR" button 122 (see FIG. 3) on the keypad 51 and the controller 50 recognizes this event and addresses the code set for the currently programmed VCR (for example, CM1 56). After this, pressing of function buttons (e.g., channel up 126—see FIG. 3) result in the controller 50 looking up the associated channel-up command representation from CM1 56 and sending it to the VCR through the transceiver 52. To control a second device, such as a television, the user presses the "TV" button 123 (see FIG. 3) on the keypad 51 and the controller 50 recognizes this event and addresses the code set for the currently programmed television (for example, CM2 58). After this, pressing of function buttons (e.g., channel up 126—see FIG. 3) result in the controller 50 looking up the associated channel-up command representation from CM2 58 and sending it to the television 5 through the transceiver 52.

Figure 3:
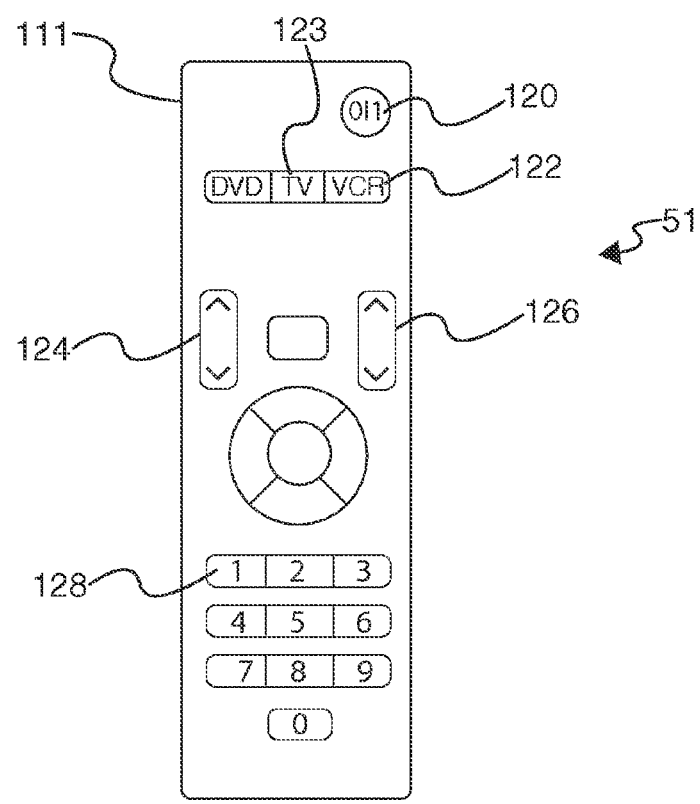
FIG. 3 illustrates a plan view of a typical remote control.

Referring to FIG. 3, a plan view of a typical remote control will be described. A typical remote control 111 includes a keypad 51. The keypad 51 has mode keys such as "VCR" 122 and "TV" 123, which control the operation of the remote control 111 (e.g., generally do not transmit a command to a device) and function keys such as volume up/down 124, channel up/down 126 and numbers 128. In some remote controls 111, certain buttons perform multiple operations. For example, in some remote controls 111, the on/off button 120 sends on/off several on/off commands to multiple controlled devices. For example, in some remote controls 111, the on/off button 120 sends on/off commands to each of the multiple controlled devices.

As an example of using the remote control 111, to control a first device, such as a VCR, a user presses the "VCR" button 122 then presses the desired function button(s) (e.g., channel up 126) resulting in the channel-up command associated with the VCR being sent to the VCR 5. To control a second device, such as a television, the user presses the "TV" button 123 then presses one of the function buttons (e.g., channel up 126) resulting in the channel-up command associated with the television 5 being sent to the television 5.

Referring to FIG. 4, a first data structure of a typical remote control will be described. In this exemplary data structure 64, the command structure for a particular code set CM5 is a two-dimensional array having two columns, one column for button name (function key) 66 and the other for button value (function key value) 68. In this simplified example, button names for volume control 70, channel control 72, on/off 74, the digit "1" 76 and the digit "2" are shown along with their respective command values of 3A20 80, 3A2F 82, 3AE2 84, 2C01 86 and 2C02 88. The data structure 64 is just one way to represent a command structure and others are known in the business and equally anticipated. For example, in one embodiment, the data structure 64 is a positional array where each position represents a particular button (e.g., the 23rd position in the array represents the channel-up function). In another embodiment, the data structure 64 is a textural array of comma-separated values (e.g., channel-up=3A2F, channel-down=3A2E . . . ). Any known data representation is anticipated.

Referring to FIG. 5, a second version of the data structure of a typical remote control will be described. This view shows that the command values for one or more functions have been changed. In this simplified example, button names for volume control 70, channel control 72, on/off 74, the digit "1" 76 and the digit "2" are shown along with their respective modified command values of 2F20 80, 3A2F 82, 3AE2 84, 2C01 86 and 2C02 88. Although only the volume control 70 command value (button value) 80 has changed from 3A20 to 2F20, it is anticipated that the present invention is capable of changing any number of command values (button values 68) for any or all code sets 64. For example, a single command from the television 5 to the remote control 111 changes the entire set of values associated with a VCR device from one manufacturer/model to a second manufacture/model. In this example, the user has two VCRs and only one VCR mode key. When the first VCR is in use, the remote control 111 is programmed to operate with the first VCR code set (e.g., 031) and when the second VCR is in use, the remote control 111 is programmed to operate with the second VCR code set (e.g., 004).

Figure 6:
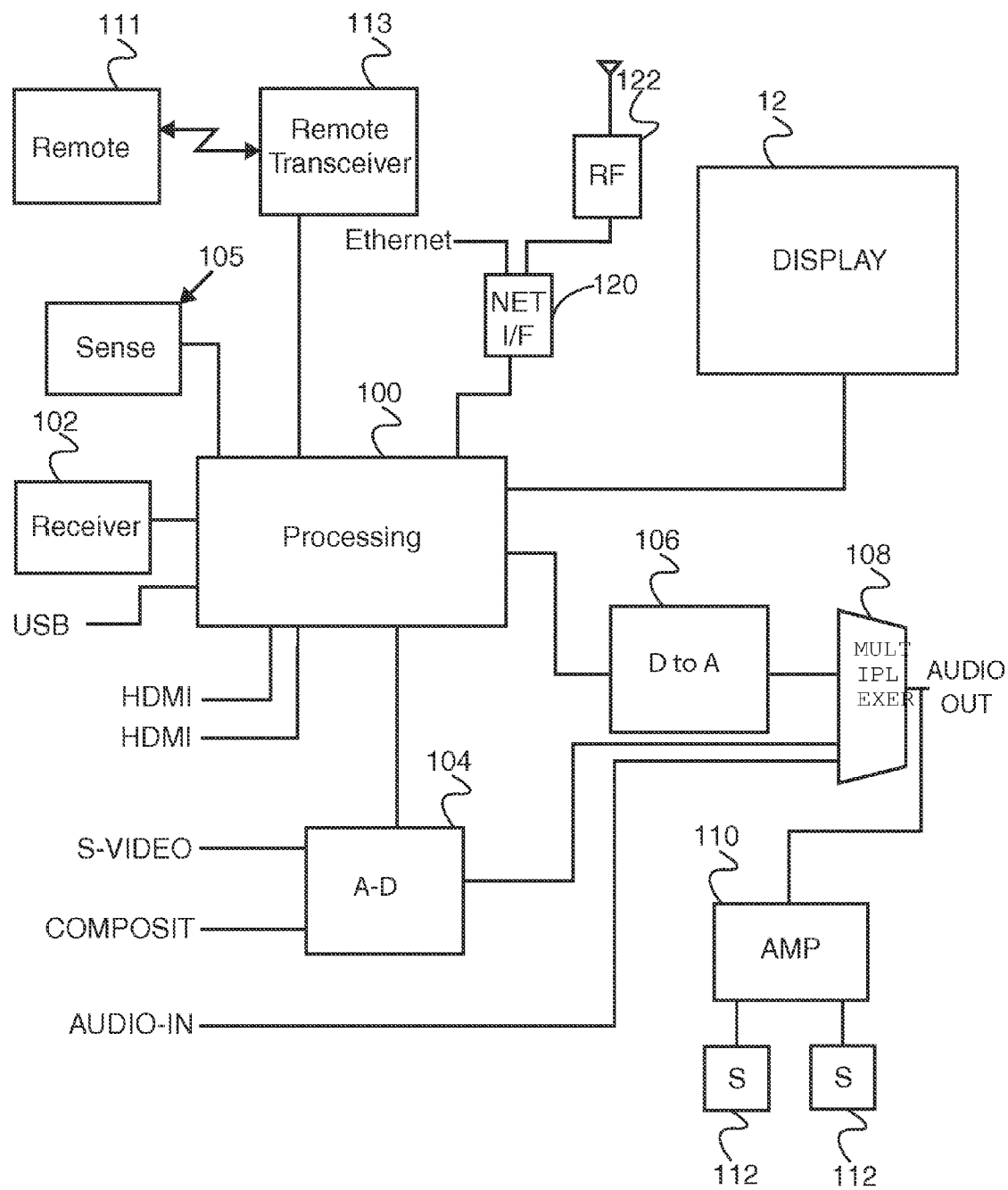
FIG. 6 illustrates a schematic view of an exemplary television system.

Referring to FIG. 6, a schematic view of a typical television will be described. This figure is intended as a representative schematic of a typical television 5 and in practice, some elements are not present in some televisions 5 and/or additional elements are present in some televisions 5. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Media Inputs (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from, for example, the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 112.

The processing element 100 accepts commands from the remote control 111 and sends commands to the remote control 111 through remote transceiver 113. Additionally, the processing element 100 sends commands to the remote control 111 through remote transceiver 113. Although IR is often used to communicate commands from the remote control 111 to and from the remote receiver 113, any known wireless technology is anticipated for connecting the remote control 111 to the processing element 100 including, but not limited to, radio frequencies (e.g., Bluetooth), sound (e.g., ultrasonic) and other spectrums of light.

In some embodiments, an ambient light sensor 105 is interfaced to the processing element 100. In such embodiments, the processing element 100 measures the current room lighting conditions and, responsive to such, adjust the brightness of the display panel 12.

A network interface 120 is present in some embodiments of a television 5 for connecting the processing element 100 to peripherals connected by, for example, Ethernet or wireless peripherals connected by radio frequencies such as WiFi/802.11 through an RF transceiver 122.

Figure 7:
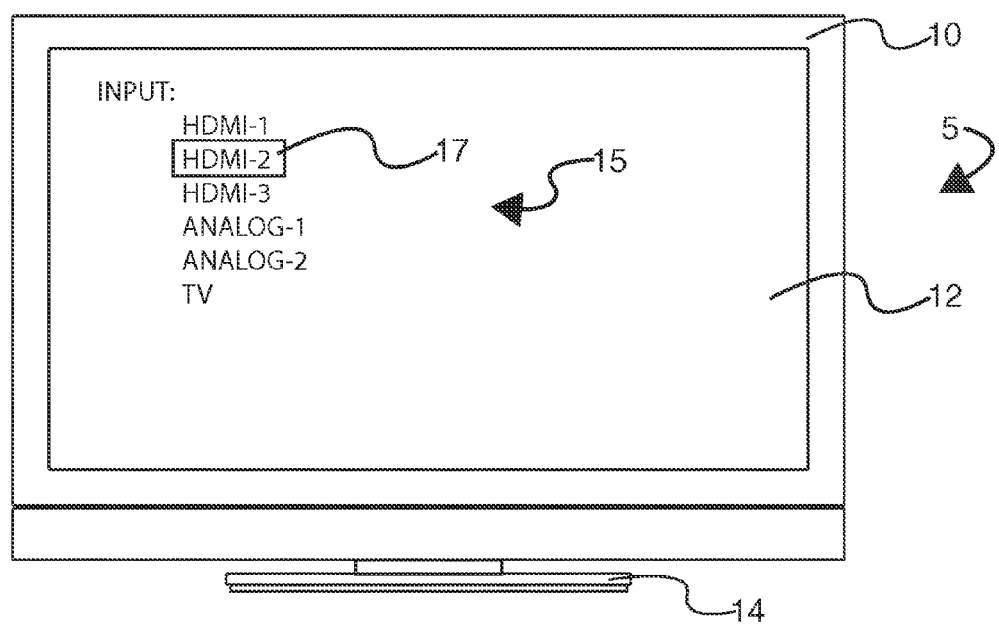
FIG. 7 illustrates a schematic view of a television with a typical input selection on-screen display.

Referring to FIG. 7, a schematic view of a television 5 with a typical input selection on-screen display will be described. An input selection on-screen display 15 is shown being displayed on the display panel 12. The selection for HDMI-2 is shown highlighted 17, indicating that a user is about to change the input of the television 5 to the HDMI-2 input (a physical cable connection to the television 5). Typically, in such a user interface, the user maneuvers the selection indicator (e.g., highlighted text 17 in this example) to the desired selection using up/down arrow keys on a remote control 111. Once the proper selection is indicated by the selection indicator, the user presses a different button on the remote control 111, such as "Select," at which time the television acts on the selection and changes to the selected input (e.g., HDMI-2). There are many known user interfaces for changing inputs to a television, including, but not limited to, buttons/switches on the television, dedicated buttons on the remote (e.g., "HDMI-1" button), dedicated cycle buttons on the remote (e.g. HDMI button cycles HDMI-1 ➞ HDMI-2 ➞ HDMI-3 ➞ HDMI-1 . . . ), user-interface navigation, etc. Other User interface navigation mechanisms are known and anticipated.

Figure 8:
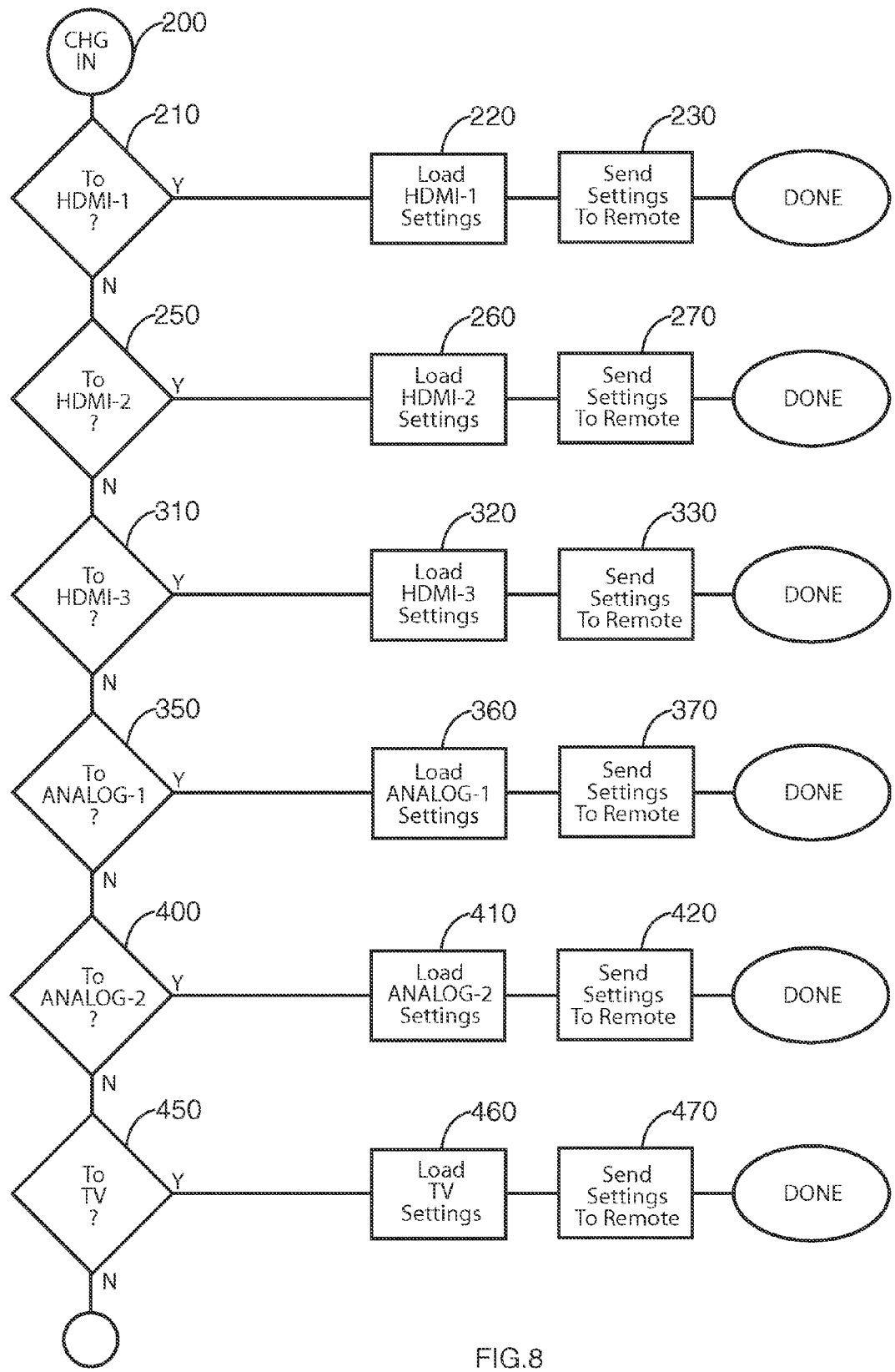
FIG. 8 illustrates a flow chart of a first exemplary event.

Referring to FIG. 8, a flow chart of a first exemplary event will be described. This is an exemplary program flow executed within the processing element 100 upon detection of an input change 200. If the input is changed to HDMI-1 210, the remote control settings associated with HDMI-1 are determined 220 and the settings are sent 230 to the remote control 111. For example, if a Sony VCR is interfaced to the HDMI-1 input, then, in the parameters/settings associated with the HDMI-1 input is an indication of the remote control code set used by the Sony VCR and that indication is sent 230 to the remote control 111 so the remote control 111 will subsequently send function codes for that Sony VCR.

If the input is changed to HDMI-2 250, the remote control settings associated with HDMI-2 are loaded 260 and the settings are sent 270 to the remote control 111.

If the input is changed to HDMI-3 310, the remote control settings associated with HDMI-3 are loaded 320 and the settings are sent 330 to the remote control 111.

If the input is changed to Analog-1 350, the remote control settings associated with Analog-1 are loaded 360 and the settings are sent 370 to the remote control 111.

If the input is changed to Analog-2 400, the remote control settings associated with Analog-2 are loaded 410 and the settings are sent 420 to the remote control 111.

If the input is changed to TV 450 (e.g., receive broadcast television through the internal receiver 102), the remote control settings associated with TV are loaded 460 and the settings are sent 470 to the remote control 111.

Figure 9:
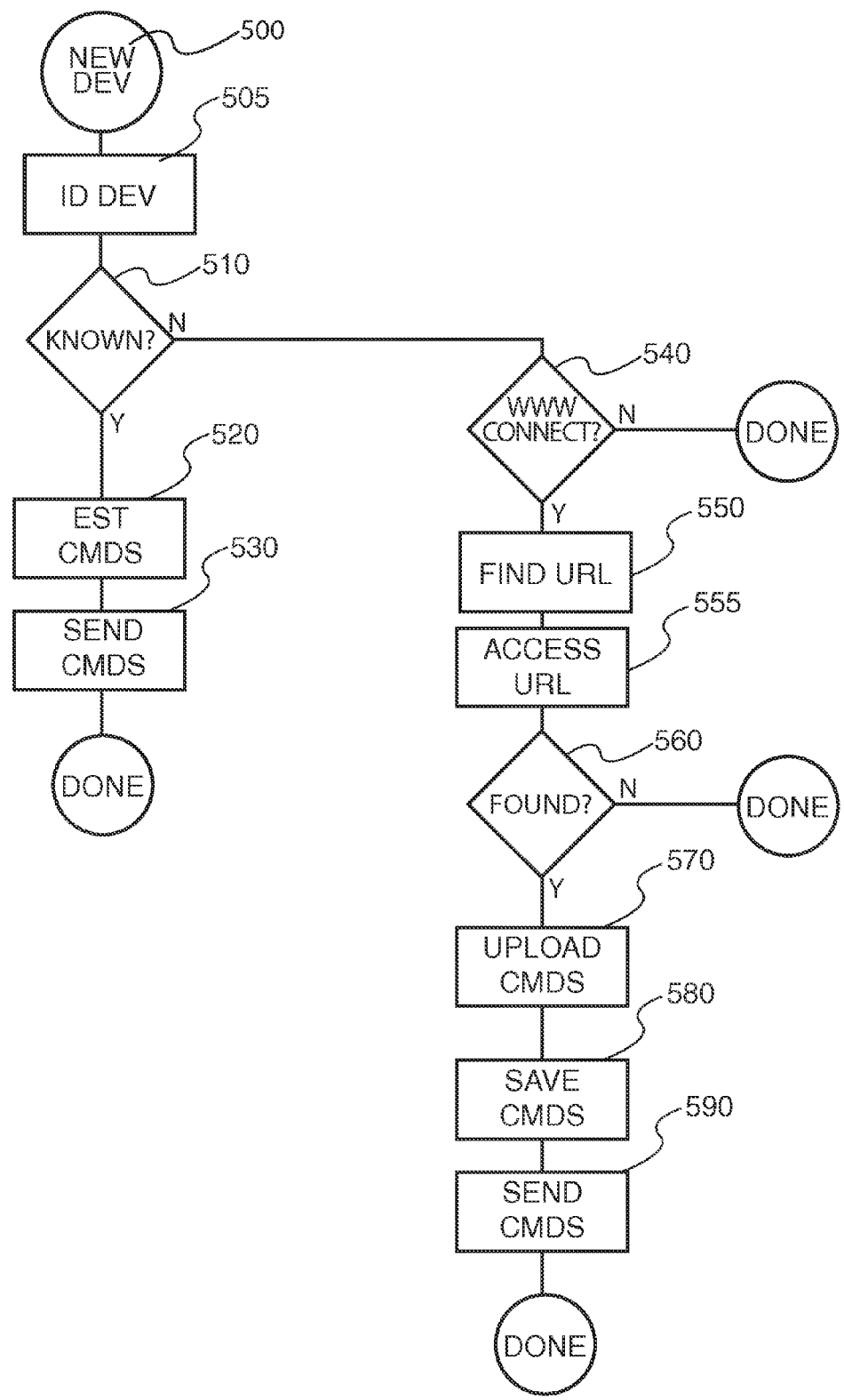
FIG. 9 illustrates a flow chart of a second exemplary event.

Referring to FIG. 9, a flow chart of a second exemplary event will be described. This is an exemplary program flow executed within the processing element 100 upon detection of a new device entering the system 500. For example, if a user connects a new disk player 24 to the television 5. First, the identity of the device is determined 505. This is accomplished by ways known in the industry including, but not limited to, querying the device itself and requesting user input of the manufacturer and model number.

Next, it is determined if the device is already known 510. For some television 5 manufacturers, a set of already known devices is pre-loaded into the processing element 100 for some of the more prevalent brands of certain devices. If the device is known, then a remote control association is made 530 with the input to which the device is connected and a set of initialization commands sent 530 to the remote control 111. In some embodiments, the initialization commands include a simple command to use a pre-programmed code set for the new device (e.g., use VCR code set 031 when "VCR" is selected). In some embodiments, the initialization commands include the type of device (e.g., VCR) and a list of button commands for that device (e.g., "pause=2A1F, play=2A2f . . . ). The remote control association is used to command the remote control 111 to operate correctly when the associated input is selected. For example, the association is "DEV-1 is associated with HDMI-3." Therefore, when HDMI-3 is selected as an input source (as in FIG. 8), the remote control 111 is instructed to use specific function codes and/or code set for DEV-1.

If it was determined that the device is not already known 510, it is next determined if the television 5 is actively connected to the Internet 540. If the television 5 is not connected to the internet 540, then the remote cannot be programmed and the process is done. If the television 5 is connected to the internet 540, then the manufacture name (e.g., brand) is used to find a Universal Resource Link (URL) 550 such as "www.vizio.com." Next, the web page at the URL is accessed to find a set of commands 555. If a set of commands isn't available 560, then the remote cannot be programmed and the process is done. If a set of commands is available 560, then a set of initialization commands are uploaded 570 from the web page and saved 580. The initialization commands are then sent 590 to the remote control 111. In some embodiments, the initialization commands include a simple command to use a pre-programmed code set for the new device (e.g., use VCR code set 031 when "VCR" is selected). In some embodiments, the initialization commands include the type of device (e.g., VCR) and a list of button commands for that device (e.g., "pause=2A1F, play=2A2f . . . ). The initialization commands are saved 580 in case the remote control 111 does not receive the initialization commands or in case the remote control 111 loses its memory of the settings and has to be re-initialized.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A television comprising:
    a display panel;
    a processing element interfaced to the display panel;
    a remote control, the remote control wirelessly interfaced to the television over a bi-direction interface, the remote control including a plurality of function keys;
    a plurality of television inputs operatively coupled to the processing element;
    at least one device connected to the television, each of the at least one device connected to the television through one of the television inputs;
    a set of parameters stored within the television;
    a means for changing the television from displaying content from a first input of the television inputs to a second input of the television inputs, the means for changing including a means for transmitting a subset of the set of the parameters to the remote control, the subset associated with the second input of the television inputs.

2. The television of claim 1, further comprising a means for inputting the set of parameters from a user interface presented by the processing element on the display panel.

3. The television of claim 1, wherein the parameters include a command to change at least one output value of the remote control, the output value associated with at least one of the function keys of the remote control.

4. The television of claim 1, wherein the parameters include a command to change a code set of output values associated with a set of the function keys, the code set associated with a device connected to the second input of the television.

5. The television of claim 1, wherein the means for transmitting is using infrared.

6. A television comprising:
a display panel;
a processing element interfaced to the display panel;
a remote control, the remote control wirelessly interfaced to the television over a bi-direction interface, the remote control including a plurality of function keys;
a plurality of inputs, the plurality of inputs including a plurality of High Definition Media Interface (HDMI) inputs operatively coupled to the processing element;
at least one source of content, each source of content connected to one of the High Definition Media Interface (HDMI) inputs;
a set of parameters associated with each of the High Definition Media Interface (HDMI) inputs;
software running on the processing element, the software configured to change the television from displaying content from a first HDMI input of the High Definition Media Interface (HDMI) inputs to a second HDMI input of the High Definition Media Interface (HDMI) inputs;
software running on the processing element, the software configured to transmit a subset of the set of parameters to the remote control responsive to the change from displaying content from the first HDMI input to the second HDMI input, the subset associated with the second HDMI input.

7. The television of claim 6, further comprising software running on the processing element, the software configured to present a user interface, the user interface configured to obtain values for the set of parameters.

8. The television of claim 6, wherein the parameters include a command to change at least one output value of the remote control, the output value associated with at least one of the function keys.

9. The television of claim 6, wherein the parameters include a command to change a code set of output values associated with a set of the function keys, the code set associated with a device connected to the second HDMI input of the television.

10. The television of claim 6, wherein the means for transmitting is using infrared.

* * * * *